(12) United States Patent
Donley, Jr.

(10) Patent No.: US 9,534,778 B1
(45) Date of Patent: Jan. 3, 2017

(54) ILLUMINATED SPRINKLER DEVICE AND SYSTEM

(71) Applicant: Jesse Ray Donley, Jr., The Colony, TX (US)

(72) Inventor: Jesse Ray Donley, Jr., The Colony, TX (US)

( * ) Notice: Subject to any disclaimer, the term of this patent is extended or adjusted under 35 U.S.C. 154(b) by 0 days.

(21) Appl. No.: 14/951,341

(22) Filed: Nov. 24, 2015

Related U.S. Application Data

(60) Provisional application No. 62/206,344, filed on Aug. 18, 2015.

(51) Int. Cl.
| | | |
|---|---|---|
| *F21V 33/00* | (2006.01) | |
| *B05B 15/00* | (2006.01) | |
| *F16K 31/06* | (2006.01) | |
| *F21V 23/02* | (2006.01) | |
| *F21V 3/02* | (2006.01) | |
| *F21W 131/109* | (2006.01) | |
| *F21Y 101/02* | (2006.01) | |

(52) U.S. Cl.
CPC ............ *F21V 33/006* (2013.01); *B05B 15/00* (2013.01); *F16K 31/06* (2013.01); *F21V 3/02* (2013.01); *F21V 23/02* (2013.01); *B05B 15/001* (2013.01); *F21W 2131/109* (2013.01); *F21Y 2101/02* (2013.01)

(58) Field of Classification Search
CPC ...... B05B 15/00; B05B 15/001; F21V 33/006; F21V 3/02; F21V 23/02; F16K 31/06; F21W 2131/109; F21Y 2101/02
USPC .............. 239/200–210, 1, 288, 288.3, 288.5
See application file for complete search history.

(56) References Cited

U.S. PATENT DOCUMENTS

| | | | |
|---|---|---|---|
| 2,593,517 A | 4/1952 | Jose | |
| 2,883,114 A | 4/1959 | Horvath | |
| 3,104,815 A | 9/1963 | Schultz | |
| 3,162,367 A | 12/1964 | Nowack | |
| 5,748,466 A * | 5/1998 | McGivern | G05B 19/0423 239/63 |
| 5,823,431 A | 10/1998 | Pierce | |
| 5,873,647 A * | 2/1999 | Kurtz | B05B 15/00 362/101 |
| 6,286,765 B1 * | 9/2001 | Byles | A01G 25/165 137/624.2 |
| 6,644,561 B1 * | 11/2003 | Daane | B05B 15/00 200/61.58 R |
| 6,761,323 B2 * | 7/2004 | Hsieh | B60Q 1/0017 239/18 |
| 2002/0158153 A1 * | 10/2002 | Zieger | B05B 1/18 239/548 |
| 2007/0126237 A1 * | 6/2007 | Liao | B05B 15/00 290/43 |

(Continued)

*Primary Examiner* — Arthur O Hall
*Assistant Examiner* — Juan C Barrera
(74) *Attorney, Agent, or Firm* — Law Office of Sam Sokhansanj PLLC

(57) ABSTRACT

An illuminated sprinkler device and system is provided that can be easily retro-fitted and installed with existing or new sprinkler systems. In one aspect, the illuminated sprinkler device includes a power converter for converting AC to DC power from a main controller, an illuminated cover having LED's for coupling with a sprinkler head, and one or more securement members for securing the illuminated cover to the sprinkler head. Here, the LED's of the sprinkler head are configured to operate in conjunction with the operation of the sprinkler system.

11 Claims, 10 Drawing Sheets

(56) References Cited

U.S. PATENT DOCUMENTS

| | | | | |
|---|---|---|---|---|
| 2007/0236913 A1* | 10/2007 | Caillaba | ................. | A01G 7/045 |
| | | | | 362/96 |
| 2012/0228399 A1* | 9/2012 | Forhan | ...................... | B05B 3/04 |
| | | | | 239/19 |
| 2013/0271969 A1* | 10/2013 | Ruthenberg | ............ | F21S 9/046 |
| | | | | 362/192 |
| 2015/0202642 A1* | 7/2015 | Isley | ........................ | B05B 9/01 |
| | | | | 239/289 |

* cited by examiner ated Sprinkler Device and System

CROSS REFERENCE TO RELATED APPLICATION

This application claims the benefit of U.S. Provisional Application No. 62/206,344 filed on Aug. 18, 2015, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Lawn and garden care and outdoor ornamentation are multi-billion dollar industries in the United States. Homeowners, residential, and commercial builders watch each spring or summer for the latest technology trend to beautify their yards and to keep a step ahead of the neighbor's creations. Improvements in watering, water conservation, power conservation and lighting are obvious areas for yard improvement. In addition, there is a desire for many homeowners to engage in "do-it-yourself" activities for improving their lawn and yard. One idea that has been brought forward before, but has failed to gain acceptance, is to combine a water sprinkler with ornamental lighting. In particular, the prior conventional systems are complex in design, have a number of moving parts, are battery operated which require constant replacing, maintenance, and corrosion, cannot be retro-fitted with existing sprinkler heads, require several tools and components to assemble, and are generally cost, time, and labor intensive.

Hence, what is needed is a simple illuminated sprinkler device and system that can be easily retro-fitted and installed with existing or new sprinkler systems while requiring minimal labor, minimal maintenance, minimal moving parts, provides an aesthetically pleasing lighting effect, does not require additional power sources, and can be cost-effective to a homeowner, residential, or commercial user.

BRIEF SUMMARY

One or more aspects of the present disclosure described herein overcome the shortfalls of prior attempted methods, devices, and systems. In particular, an illuminated sprinkler device and system is provided that can be easily retro-fitted and installed with existing or new sprinkler systems while requiring minimal labor, minimal maintenance, minimal moving parts, provides an aesthetically pleasing lighting effect, runs off existing power sources, durable and reliable, and can be cost-effective to a homeowner, consumer, or commercial user. In one aspect, the illuminated sprinkler device and system includes a power converter for converting AC to DC power from a main controller, an illuminated cover for coupling with a sprinkler head, and one or more securement members for securing the illuminated cover to the sprinkler head.

In another aspect of the disclosure described herein, an illuminated sprinkler device is disclosed having an AC to DC power converter coupled to a sprinkler system zone control unit, a cover having a lower end opening, the cover configured to receive a sprinkler head. In addition, one or more securement members configured to secure the cover to the sprinkler head, and a plurality of light emitting devices enclosed within the cover, the light emitting devices coupled to the power converter. Further, the cover can include a circular transparent compartment configured to enclose the light emitting devices. Here, the light emitting devices can be configured in a concentric circle orientation. The cover can further include a second opening, wherein the second opening is smaller than the lower end opening. The second opening can also be configured to align with a nozzle of the sprinkler head. The cover can further include a circular flanged lip. Here, the power converter can be within a water sealed capsule. In another aspect of the disclosure described herein, a sprinkler device illumination method is disclosed, the method including inserting sprinkler head within a lower end opening of a cover, the cover having one or more light emitting devices disposed therein, securing the cover to the sidewalls of the sprinkler head via one or more securement members, and operating a sprinkler system zone control unit, wherein the control unit simultaneously powers a solenoid of a sprinkler valve and a AC to DC power converter, wherein the power converter powers the light emitting devices.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

Figure 1:
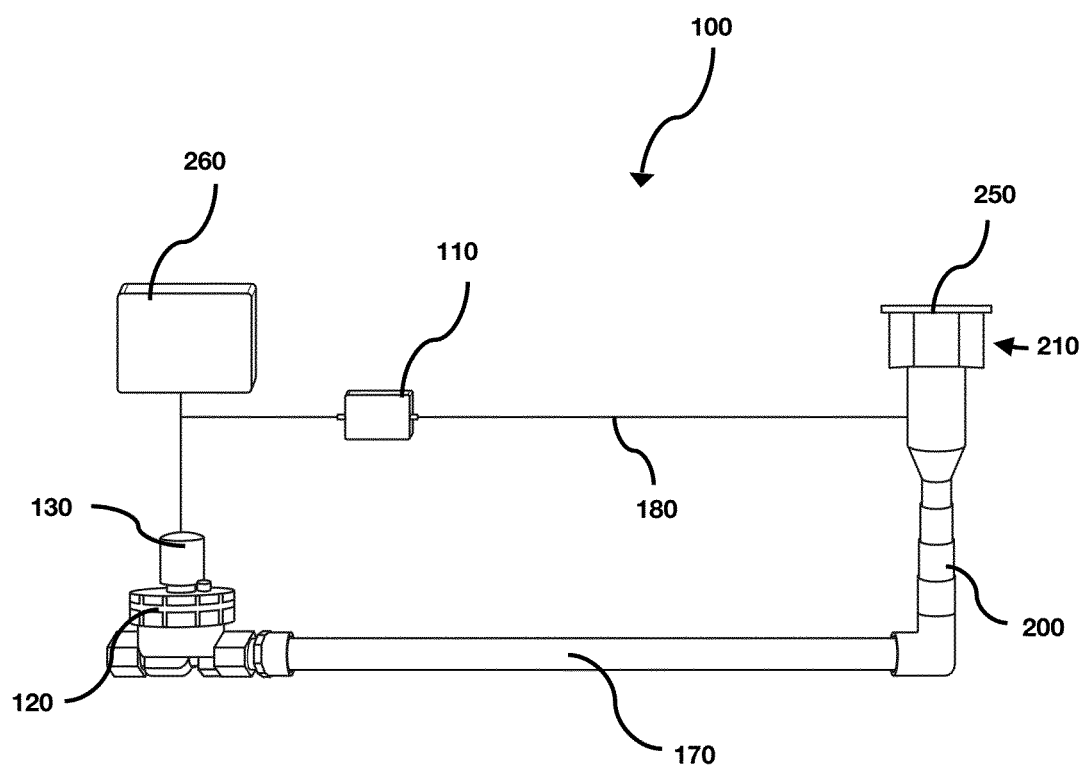
FIG. 1 illustrates a side view of an integrated illuminated sprinkler device and related components according to one non-limiting embodiment of the disclosure described herein, as assembled and integrated with a sprinkler head, corresponding piping, and valve.
Figure 2:
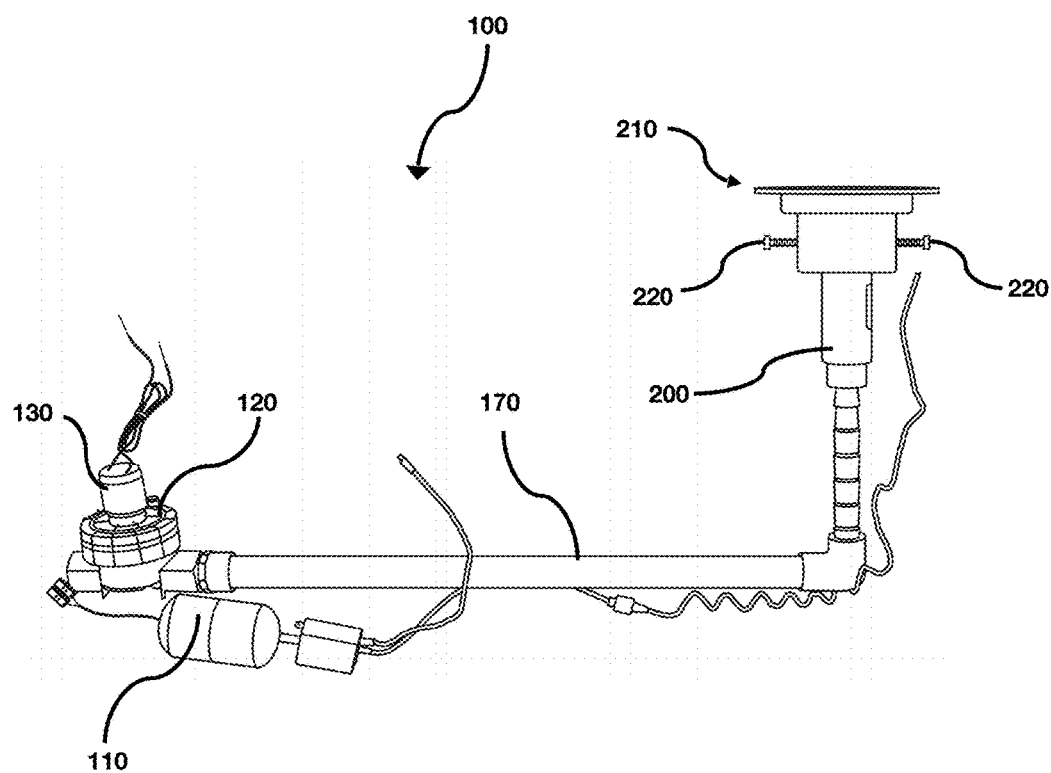
FIG. 2 illustrates another more detailed side view of the integrated illuminated sprinkler device and related components, as assembled and integrated with a sprinkler head, corresponding piping, and valve.

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

FIGS. 1 through 5 illustrate an illuminated sprinkler device embodying the principles and concepts of the disclosure described herein and designated by the reference numeral 100. In particular, the illuminated sprinkler device assembly 100 includes an AC 24-volt to DC 12-volt power converter 110 with cables 112 and 114 for receiving and transmitting power/current from a main sprinkler or irrigation system zone control unit 260, wherein the main zone control unit 260 also operates the solenoid valve 130. Alternatively, converter 110 may also be directly connected to T-joint valve 120 for converting the power to 12-volt light emitting device (LED) lighting module 210. Specifically, 24-volt AC power, voltage, and current transmitted from main control unit 260 is split and diverted to converter 110 for converting to DC 12-volt and transmitting the power via line 180 for powering LEDs 240 of LED lighting module 210. Meanwhile, the 24-volt power is being transmitted simultaneously, and independent of LED module 210, to solenoid valve 130 for controlling one or more of the sprinkler valves 120 and piping 170 for regulating water flow to sprinkler head 200.

In general, a sprinkler system main zone control units send AC power to a plurality of solenoid valves based on controlled and timed schedules, thereby opening/closing the solenoid valves based on the controlled and pre-defined schedule at the main zone control unit timer. Here, the illuminated sprinkler device of the disclosure described also operates simultaneously at the time the solenoid valve 130 receives its power and converting the AC power to DC power for LED's 210, wherein the LEDs are illuminated at or around the same time, or in sync, with the sprinkler system (i.e. main zone control unit or solenoid valves) as sprinkler heads emit water onto the lawn or garden. Hence, the illuminated sprinkler device of the disclosure described herein does not require additional power sources and can work with the existing power delivered to the solenoid valves of the existing or new sprinkler system. Alternatively, the LED's may have their own independent controller operating the light sources independent of the main zone control unit.

Figure 3:
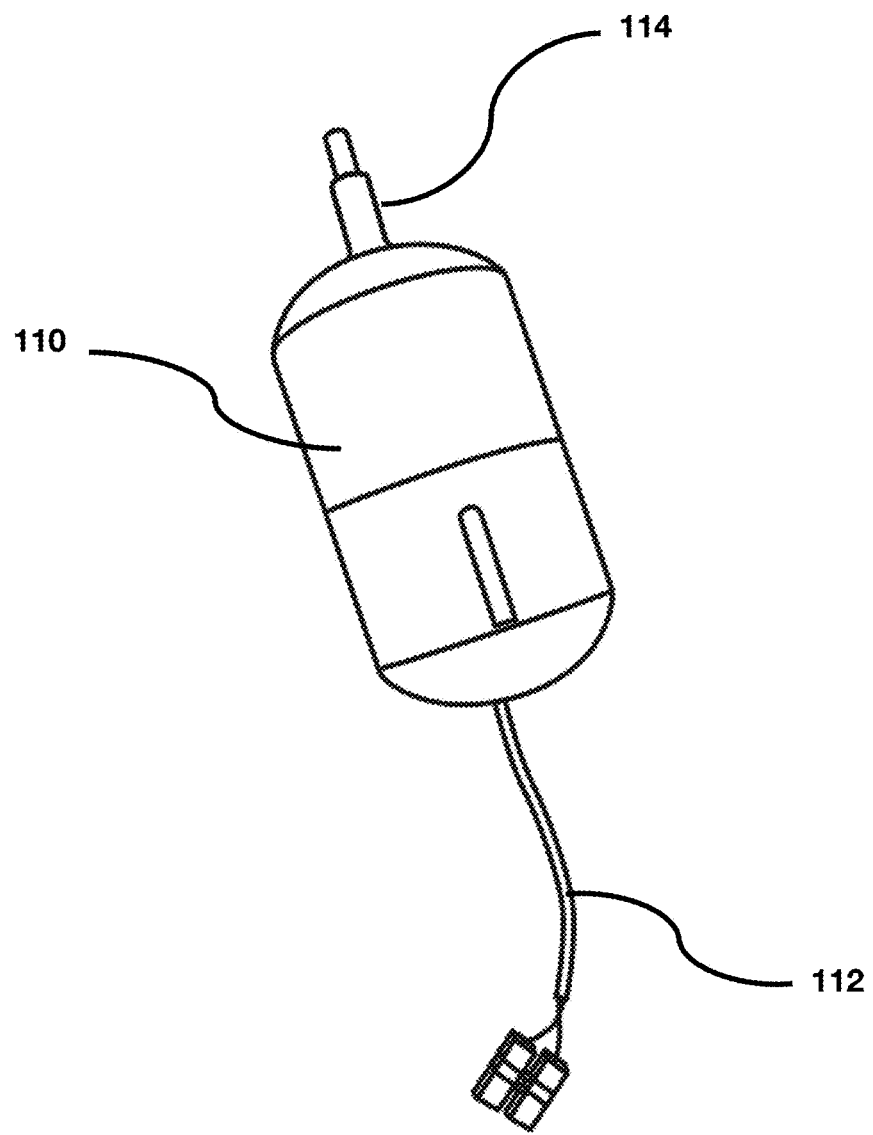
FIG. 3 illustrates a top perspective view of a power converter for the illuminated sprinkler device of the disclosure described herein.

Referring now to FIG. 3, AC to DC power converter module 110 can be configured as a cylindrical waterproof sealed container having electrical components therein. In can further include input and output ports 112 and 114 having any type of cable and any type of connector end. Here, the power converter is an AC 24 volt to DC 12 volt converter, however other types of converters may also be used, such as 12 AC volt to 12 DC volt converter, 12 DC volt to 12 AC volt inverter, or 12 DC volt to 24 AC volt inverter, among others.

Referring to FIGS. 4A-4F, LED lighting module head cover 210 can include a transparent sealed water-proof compartment 242 for housing LED or lighting components 240 therein. In the current embodiment, LED components 240 may be a lighting strip having more than twenty (20) individual LED's arranged in a circular orientation. However, it is contemplated within the scope of the disclosure described herein, that there may be any number of LED components or configurations, including but not limited to two or more LED concentric strips arranged in varying diameters or cascading/stacked configurations. In addition, LED components 240 may also be pre-programmed or remotely operated to generate, project, and display a variety of colors, schemes, patterns, text, images, and indicia. Further, in an illuminated sprinkler system having a multiple LED modules 210, each module 210 may operate with respect to other modules 210 either in sync, out-of-sync, simultaneously, continuously, or based on pre-defined settings.

Figure 4A:
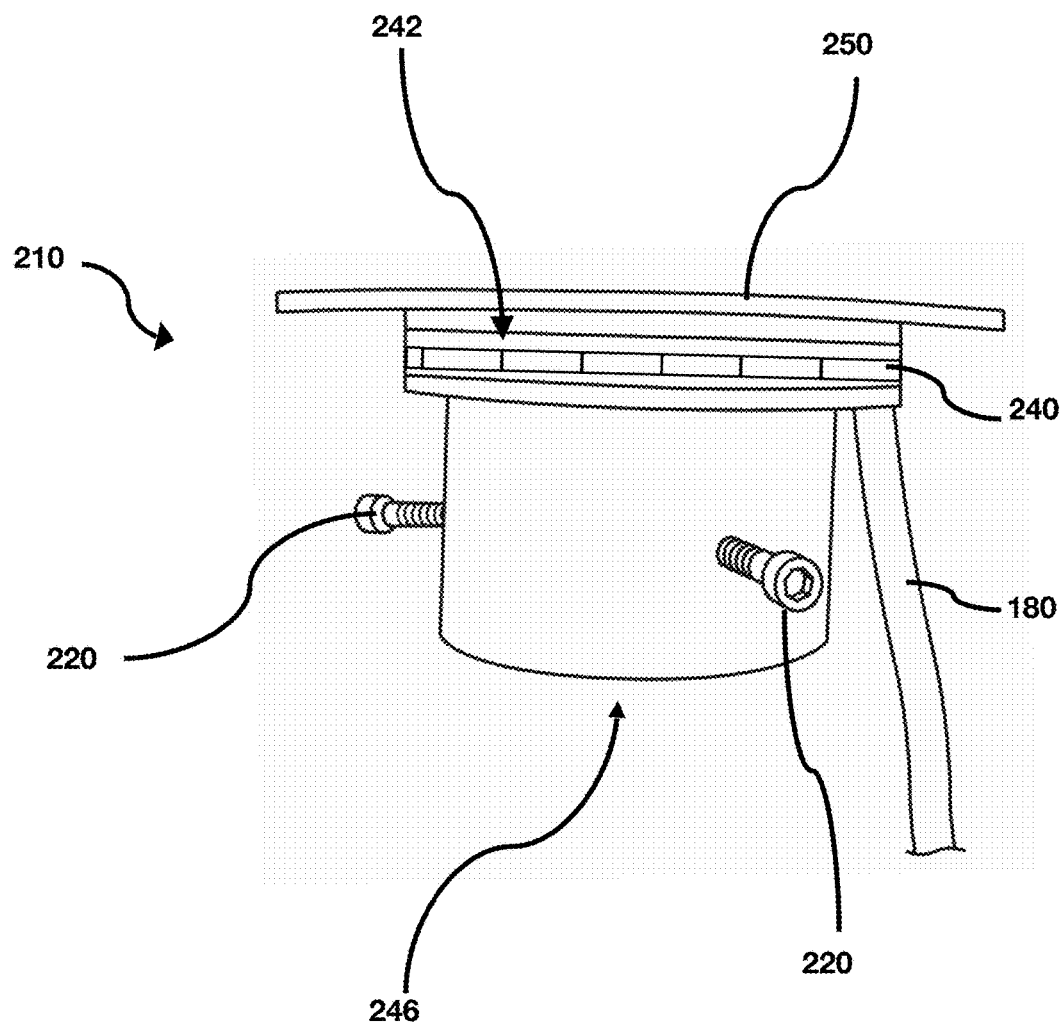
FIG. 4A illustrates a perspective side view for an illuminated sprinkler head cover LED lighting module for the illuminated sprinkler device of the disclosure described herein.
Figure 4B:
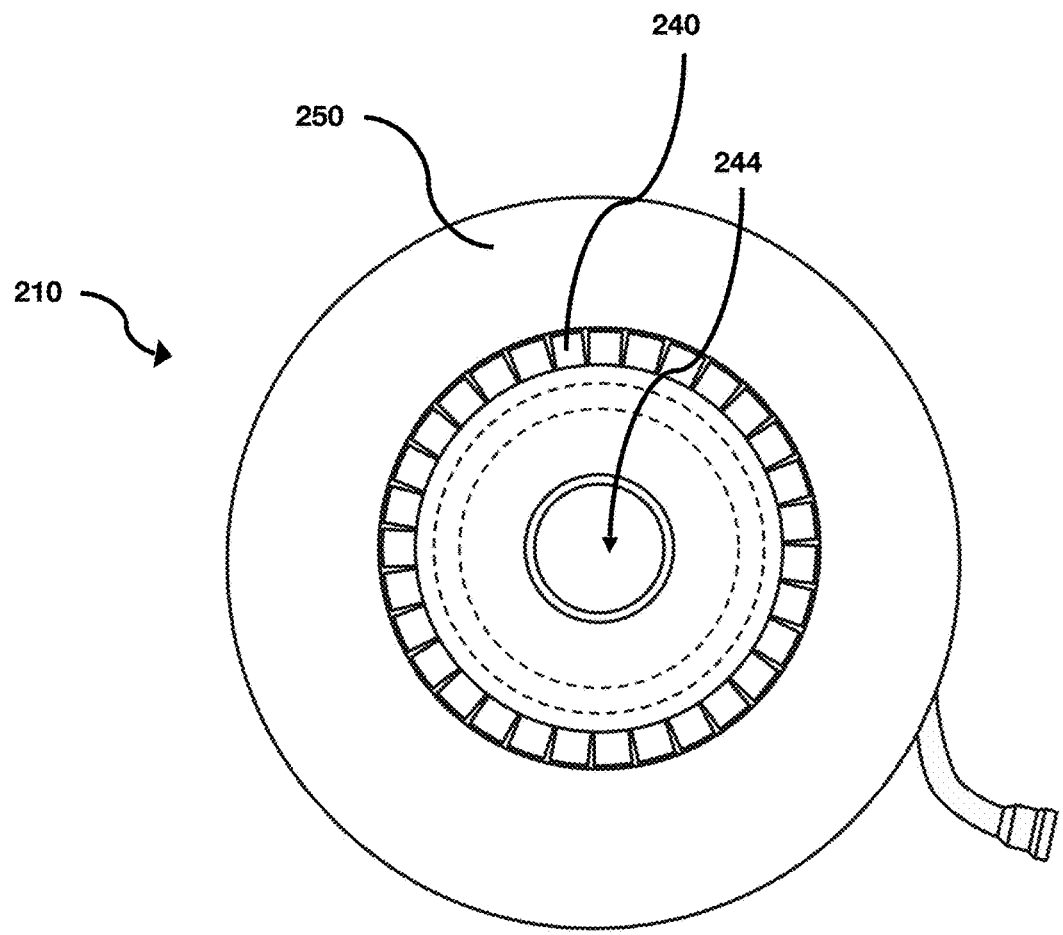
FIG. 4B illustrates a top view for the illuminated sprinkler head cover LED lighting module embodiment of FIG. 4A.
Figure 4C:
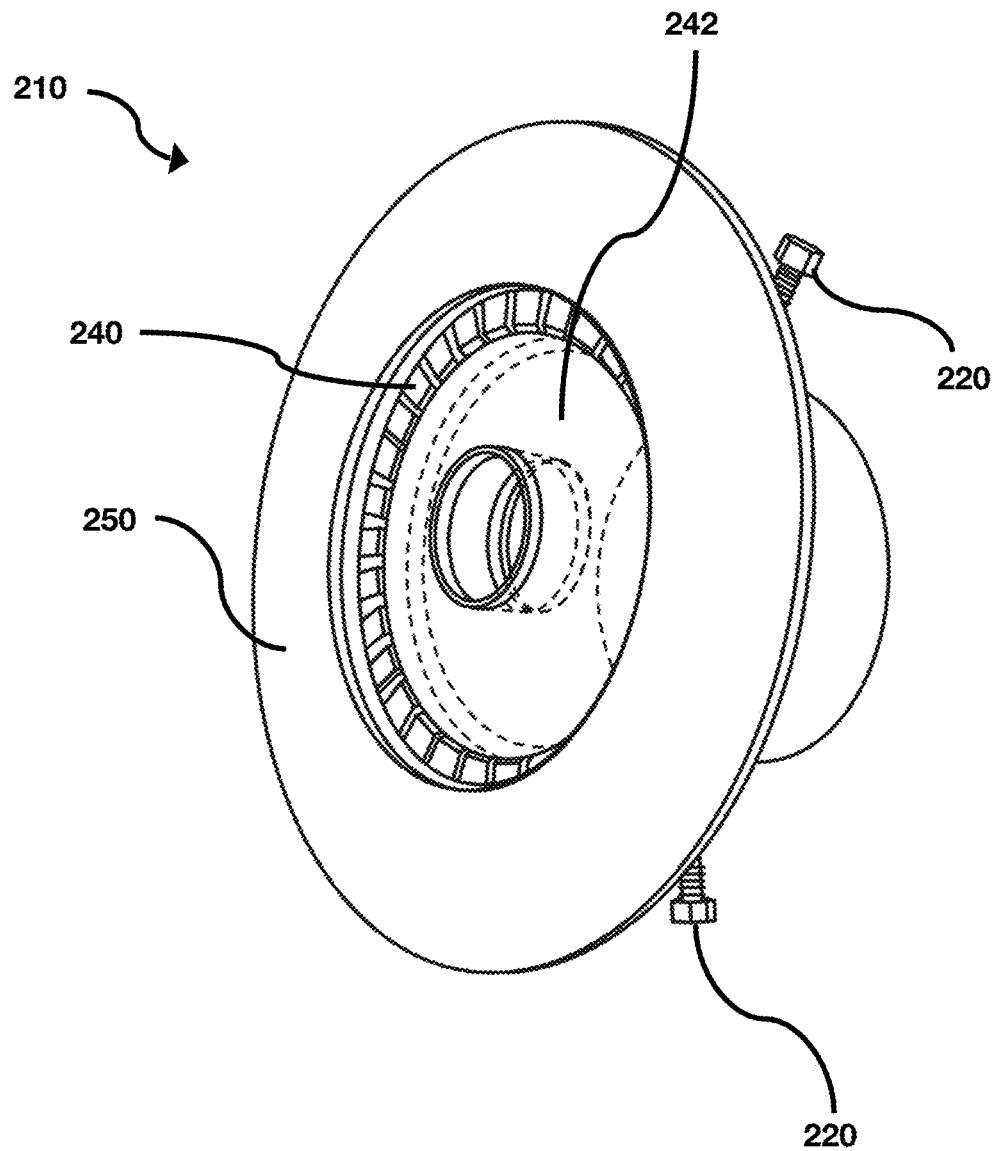
FIG. 4C illustrates a perspective side view for the illuminated sprinkler head cover LED lighting module embodiment of FIG. 4A.
Figure 4D:
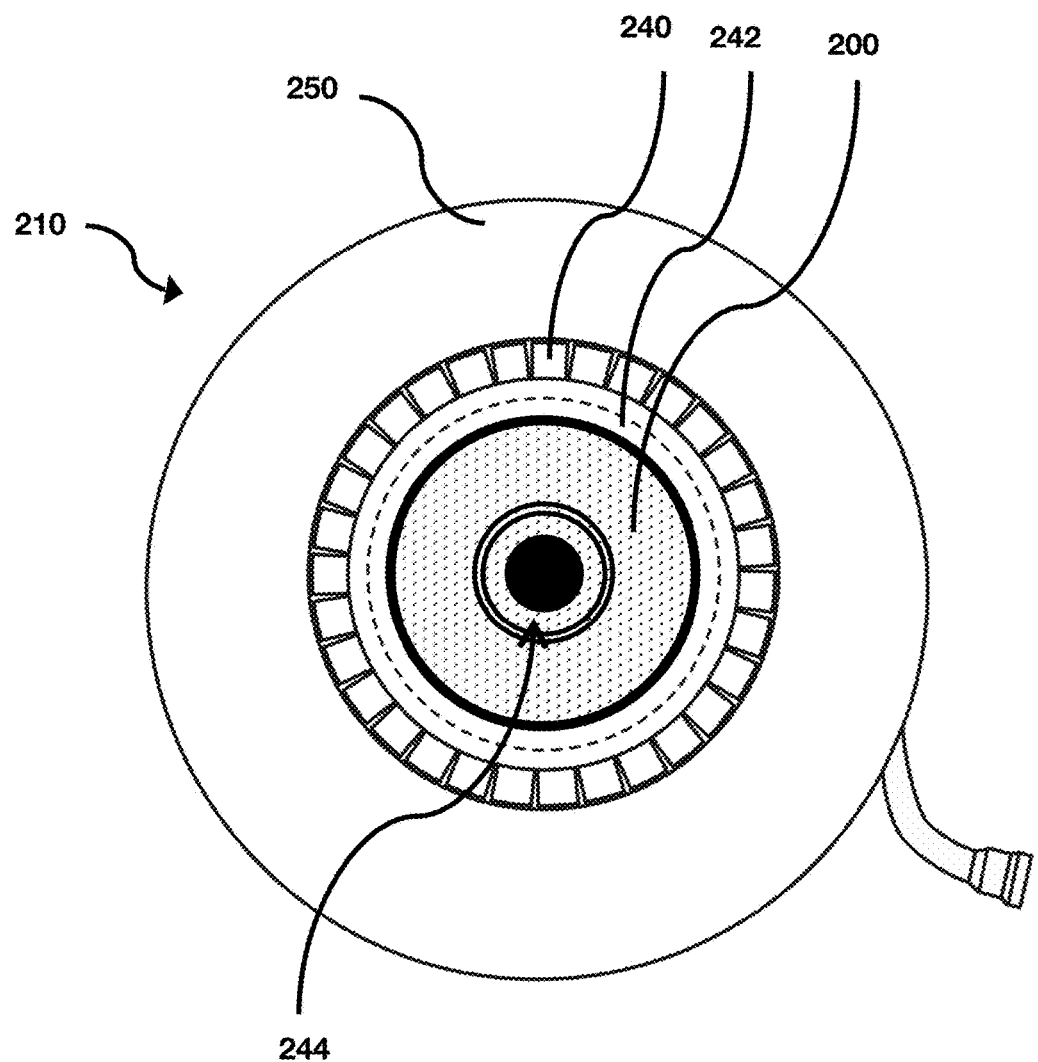
FIG. 4D illustrates a top view for the illuminated sprinkler head cover LED lighting module embodiment of FIG. 4A, as assembled onto to a sprinkler head.
Figure 4E:
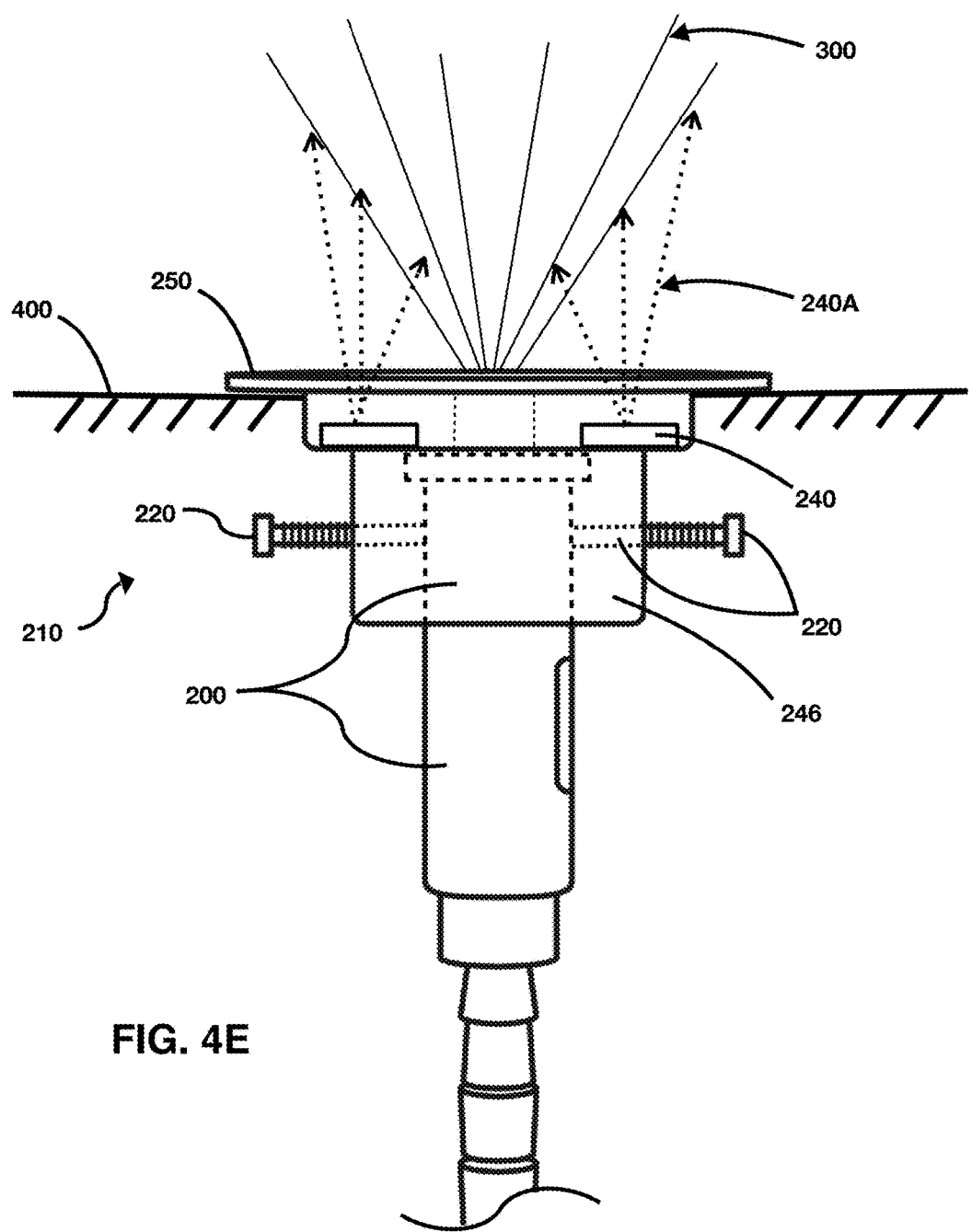
FIG. 4E illustrates a partial side view for the illuminated sprinkler device of the disclosure described herein as assembled to an underground sprinkler system having a sprinkler head assembly, thereby illuminating light onto dispensed water from the sprinkler system.
Figure 4F:
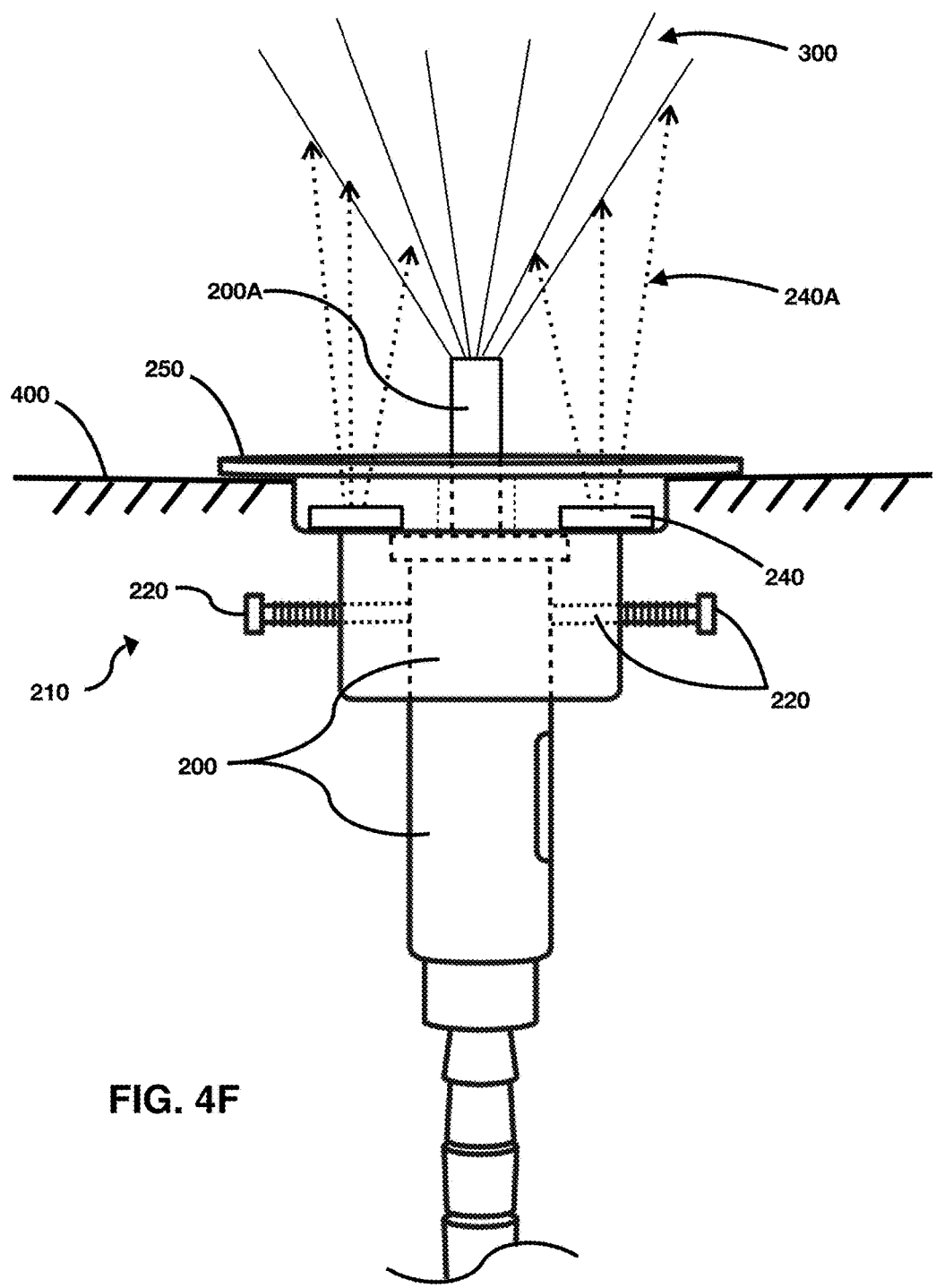
FIG. 4F illustrates a partial side view for the illuminated sprinkler device of the disclosure described herein as assembled to an underground sprinkler system having a sprinkler head assembly with a pop-up nozzle, thereby illuminating light onto dispensed water from the sprinter system.

Still referring to FIGS. 4A-4F, module 210 further includes a flanged lip 250 outer housing for securing LED compartment housing 242 therein. In particular, flanged lip 250 allows module 210 to rest securely on top of soil without sinking into the soil. In addition, the diameter of lip 250 allows LEDs 240 to project clearly on to water without being partially or substantially blocked or obstructed by surrounding grass or plants. Further, LED compartment 242 also include an opening 244 for receiving a sprinkler head, such as sprinkler head 200, in order to allow the water from the sprinkler head nozzle to project and disperse there through without altering the original intended direction and angle of the sprinkler head nozzle and water spray. Further, sprinkler head 200 may have a pop-up or extending head or nozzle 200A that can extend through and out of opening 244, as shown in FIG. 4F.

In addition, module 210 also includes a plurality of threaded fastening and securement members 220 for securing module 210 to the sprinkler head. More specifically, FIG. 4E-4F illustrate securement members 220 securely tightened, fastened, and coupled to the sidewalls of the sprinkler head 200, thereby preventing sprinkler head 200 from moving within the LED lighting module head cover 210 or displacing module 210 from the water pressure. This further allows the head of sprinkler 200 to be accurately aligned within lower end opening 246 of module 210. It is contemplated within the scope of the disclosure described herein that any other securement members may be used in addition to or lieu of securement members 220, including but not limited to bolts, screws, adhesives, clamp, clasps, straps, buckles, and the like.

Still referring to FIGS. 4D-4G, LED lighting module 210 is shown assembled on to sprinkler head 200 into ground 400, wherein sprinkler head 200 is one of an array of underground sprinkler heads and sprinkler system plumbing. More specifically, flanged lip 250 of module 210 allows the modules 210 to at least be partially secured within and above a lawn, grass, soil, or ground 400. In addition, module 210 can be color coded to various shades of green, brown, or earth tones to blend with ground 400. FIG. 4E illustrates sprinkler head 200 aligned and secured within lower opening 246 of module 210, wherein the water 300 dispersed from the nozzle of the sprinkler head through and out of opening 244 of module 210 and is illuminated via LED's 240 projecting light 240A directly on the water stream, spray, and molecule, as shown FIGS. 4E-4F and FIG. 5. FIG. 4F illustrates an another embodiment for sprinkler head 200 further including a pop-up or extendable nozzle head that can be axially aligned and extended through opening 244 of module 210, and extending above the top flanged surface 250.

Figure 5:
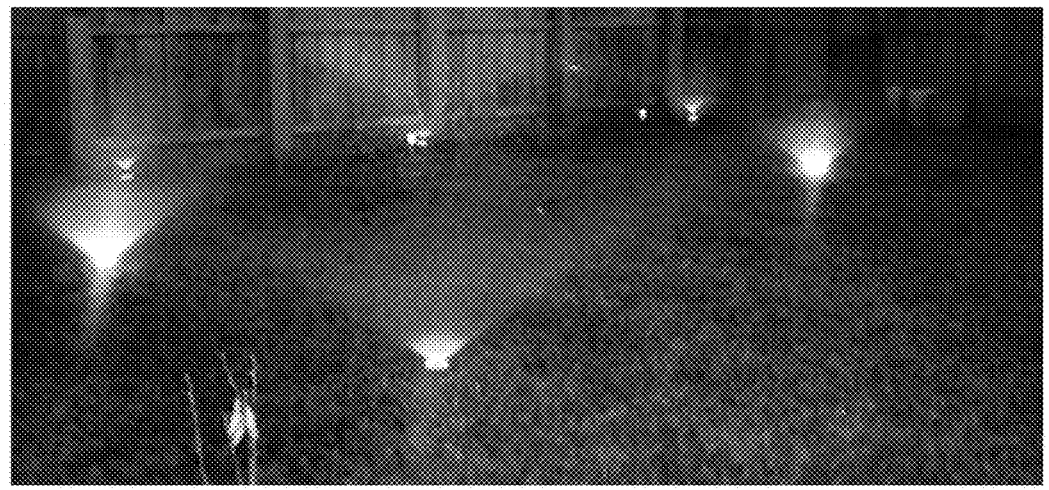
FIG. 5 illustrates a perspective environmental view for the illuminated sprinkler device of the disclosure described herein having a plurality of lighting modules as installed within a lawn and illuminated, according to one non-limiting embodiment of the disclosure described herein.
Figure 5:
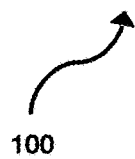

FIG. 5 illustrates the illuminated sprinkler of the disclosure described herein shown having a plurality of LED lighting modules. Here, each LED lighting module may be powered via their own independent power converter or one or more power converters transmitting power to all of the LED lighting modules in an illuminated sprinkler system of a user's lawn or landscape. In addition, the it is contemplated within the scope of the disclosure described herein that there may any number of type of configurations for the LED lighting modules assembled and linked together, or alternatively operating independent of each other. In addition, the LED components may also be oriented, angled, or positioned in any direction or projection pattern. Further, other types of lighting components may be used in addition to or in lieu of LED's, including but not limited to halogen, fluorescent, HIID, and lasers.

Having thus described the several embodiments of the present disclosure described herein, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention. Although the present disclosure described herein has been described in considerable detail with reference to certain preferred versions or embodiments thereof, other versions and embodiments are possible. Therefore, the spirit and scope of the appended claims should not be limited to the description of the embodiments contained herein.

What is claimed is:

1. An illuminated sprinkler device comprising:
    an AC to DC power converter configured to couple to a lawn sprinkler system zone control unit and one or more solenoid valves;
    a cover having a lower end opening, the cover configured to receive a sprinkler head;
    the cover further comprising an annular compartment for housing a plurality of light emitting devices, wherein the plurality of light emitting devices are coupled to the AC to DC power converter;
    the cover further comprising a flat annular lip, wherein the flat annular lip is disposed above the annular compartment and configured to rest on top of soil;
    one or more securement members configured to secure the cover to the sprinkler head and further configured to directly couple to the sprinkler head; and
    wherein the AC to DC power converter is configured to operate the light emitting devices, and wherein the light emitting devices are configured to operate in conjunction with the one or more solenoid valves.

2. The illuminated sprinkler device of claim 1, wherein the annular compartment is transparent.

3. The illuminated sprinkler device of claim 2, wherein the light emitting devices are configured in a concentric circle orientation.

4. The illuminated sprinkler device of claim 1, wherein the cover further comprises a second opening, wherein the second opening is smaller than the lower end opening.

5. The illuminated sprinkler device of claim 4, wherein the second opening is configured to align with a nozzle of the sprinkler head.

6. The illuminated sprinkler device of claim 1, wherein the flat annular lip has the largest diameter of the entire cover.

7. The illuminated sprinkler device of claim 1, wherein the power converter is within a water sealed capsule.

8. The illuminated sprinkler device of claim 1, wherein the power converter is between the sprinkler system zone control unit and the one or more solenoids.

9. The illuminated sprinkler device of claim 1, wherein the securement members are threaded fasteners coupled to the cover.

10. A sprinkler device illumination method, the method comprising:
    inserting sprinkler head within a lower end opening of a cover, the cover having one or more light emitting devices disposed therein and a flanged lip extending outwards;
    securing the cover to the sidewalls of the sprinkler head via one or more securement members thereby directly engaging the sprinkler head;
    at least partially placing the cover within soil, wherein the flanged lip rests on top of the soil; and
    operating a lawn sprinkler system zone control unit, wherein the control unit simultaneously powers a solenoid of a sprinkler valve and an AC to DC power converter, wherein the AC to DC power converter powers the light emitting devices.

11. An illuminated sprinkler system comprising:
    an AC to DC power converter configured to connect between a sprinkler zone control unit and one or more solenoid valves;
    a cover having a lower end opening, the cover configured to receive a sprinkler head;
    the cover further comprising a flat flanged lip extending outwards from the cover, wherein the flat flanged lip is configured to rest on top of soil;
    one or more securement members configured to secure the cover to the sprinkler head and further configured to directly couple to the sprinkler head;
    a plurality of light emitting devices enclosed within the cover, the light emitting devices coupled to the AC to DC power converter; and wherein the AC to DC power converter is configured to deliver power to the light emitting devices.

\* \* \* \* \*